United States Patent [19]
Shimada et al.

[11] Patent Number: 5,953,890
[45] Date of Patent: Sep. 21, 1999

[54] ELECTRIC LAWN MOWER

[75] Inventors: Kenzo Shimada; Tetsuo Iida; Joji Maeda; Tsutomu Inui, all of Saitama, Japan

[73] Assignee: Honda Giken Kogyo Kabushiki Kaisha, Tokyo, Japan

[21] Appl. No.: 09/005,047

[22] Filed: Jan. 9, 1998

[30] Foreign Application Priority Data

Jan. 14, 1997 [JP] Japan .................................. 9-005089
Oct. 23, 1997 [JP] Japan .................................. 9-290846

[51] Int. Cl.$^6$ .................................................. A01D 69/00
[52] U.S. Cl. ......................... 56/11.9; 56/16.7; 56/10.2 R
[58] Field of Search ............... 56/10.2 R, 11.9, 56/DIG. 7, 16.7

[56] References Cited

U.S. PATENT DOCUMENTS

| | | |
|---|---|---|
| 2,597,735 | 5/1952 | Jepson . |
| 4,064,680 | 12/1977 | Fleigle ..................................... 56/11.9 |
| 5,402,626 | 4/1995 | Zinck . |
| 5,442,901 | 8/1995 | Niemela et al. .......................... 56/11.9 |
| 5,502,957 | 4/1996 | Robertson ................................ 56/11.9 |
| 5,606,851 | 3/1997 | Bruener et al. .......................... 56/11.9 |
| 5,619,845 | 4/1997 | Bruener et al. .......................... 56/11.9 |

FOREIGN PATENT DOCUMENTS

| | | |
|---|---|---|
| 2 039 175 | 1/1971 | France . |
| 2039175 | 1/1971 | France . |
| 2 742 300 | 11/1996 | France . |
| 295 13 479 U | 12/1995 | Germany . |
| WO9115107 | 10/1991 | WIPO ..................................... 56/11.9 |

*Primary Examiner*—Thomas B. Will
*Assistant Examiner*—Arpad Fabian Kovacs
*Attorney, Agent, or Firm*—Nikaido Marmelstein Murray & Oram LLP

[57] ABSTRACT

In an electric lawn mower, a cutter housing includes a support plate portion for mounting an electric motor. The electric motor is disposed at a substantially central portion of the cutter housing and is connected directly to a cutter. A scroll portion is bulged from an outer edge of the support plate portion on either the left or right side of the electric motor and is sloped up rearwards. The scroll portion is formed into such a shape that it widens as it becomes closer to a discharge port at a rear of the cutter housing. Batteries are mounted on the support plate portion in an arrangement such that one of the batteries extends along an inner side of the scroll portion. The electric motor is sandwiched between front ends of the batteries. Thus, the lateral weight balance of the cutter housing is substantially uniform to enhance the travelability. Furthermore, the cutter housing is made compact.

4 Claims, 13 Drawing Sheets

ELECTRIC LAWN MOWER

BACKGROUND OF THE INVENTION

1. Field of the Invention

The present invention relates to a walking type of electric lawn mower designed so that a cutter, accommodated in a cutter housing, is driven by an electric motor.

2. Description of the Related Art

U.S. Pat. No. 5,402,626 discloses an electric lawn mower including a single battery disposed at the rear of an electric motor which is mounted at a substantially central portion on a cutter housing. French Patent No. 2,039,175 discloses an electric lawn mower, including an electric motor mounted on a cutter housing in a rear of a rotational axis of a cutter, and a pair of batteries mounted on the cutter housing between the rotational axes of the electric motor and the cutter.

In the electric lawn mower disclosed in U.S. Pat. No. 5,402,626, a scroll portion, sloped up rearwards on the right of the electric motor, is provided on the cutter housing having a shape that widens rearwardly to relatively enlarge the area of a discharge port. The single battery, having an attitude extending in a longitudinal direction of the electric lawn mower, is disposed in a rear of the electric motor in such a manner as to avoid the scroll portion at a location offset leftwards from a straight line extending in the longitudinal direction of the electric lawn mower through the axis of the electric motor. Therefore, a space above the cutter housing in a rear of the electric motor is required for disposition of a battery having an attitude extending in the longitudinal direction of the electric lawn mower. Hence, the longitudinal length of the cutter housing is relatively increased. Since the battery, having a relatively large weight, is disposed offset leftwards on the cutter housing, the lateral weight balance of the cutter housing is non-uniform. If a pair of batteries are mounted on the cutter housing of the electric lawn mower disclosed in U.S. Pat. No. 5,402,626 in order to increase electric power capacity, the lateral weight balance of the cutter housing is further non-uniform, resulting in a reduced travelability of the electric lawn mower.

In the electric lawn mower disclosed in French Patent No. 2,039,175, the pair of left and right batteries are mounted on the cutter housing in front of the electric motor. With such an arrangement, the lateral weight balance of the cutter housing is substantially uniform. However, the arrangement is such that power from the electric motor is transmitted to the cutter through a power transmitting means such as a transmitting belt. Hence, a space at a central portion of the cutter housing is required for disposition of a driven pulley which is connected to a rotary shaft of the cutter housing. Therefore, the cutter housing must be relatively large-sized.

SUMMARY OF THE INVENTION

Accordingly, it is an object of the present invention to provide an electric lawn mower wherein the lateral weight balance of the cutter housing is substantially uniform to enhance the travelability, and the cutter housing is compact.

To achieve the above object, according to a first aspect and feature of the present invention, there is provided an electric lawn mower comprising a cutter which is rotatably accommodated in a cutter housing including front and rear wheels. An electric motor is mounted on the cutter housing and provides a rotational power to the cutter. A pair of batteries is mounted on the cutter housing and supplies electric power to the electric motor. The cutter housing has a discharge port defined in a rear end thereof for discharging lawn pieces cut by the cutter. The cutter housing includes a support plate portion for mounting the electric motor which is disposed at a substantially central portion of the cutter housing and which is connected directly to the cutter. A scroll portion, which is bulged from an outer edge of the support plate portion on either left or right sides of the electric motor, guides the lawn pieces to the discharge port. The scroll portion is formed on the cutter housing into such a shape that it is sloped up rearwards and widens as it approaches the discharge port. The batteries are mounted on the support plate portion in an arrangement such that one of the batteries extends along an inner side of the scroll portion. The electric motor is sandwiched between front ends of the batteries.

Thus, the lateral weight balance of the cutter housing is substantially uniform by the fact that at least the front ends of the batteries are located on opposite sides of the electric motor. Furthermore, a length of a space needed above the cutter housing in a rear of the electric motor for mounting of the batteries can be relatively shortened. Therefore, the longitudinal length of the cutter housing can be relatively shortened. In addition, since the electric motor is connected directly to the cutter, a space for disposing a power transmitting means between the electric motor and the cutter is not required above the cutter housing, whereby the cutter housing can be made compact. Moreover, one of the batteries is disposed along the inner side of the scroll portion which is wider than the other side as it approaches the discharge port. Hence, the area of the discharge port cannot be narrowed due to the mounting of the pair of batteries. Additionally, since the batteries are mounted on the support plate portion which is at a relatively low location, the batteries can be mounted at the relatively low location, thereby lowering the center of gravity of the traveling section including the cutter housing, and suppressing the height of the traveling section to a relatively low level.

To achieve the above object, according to a second aspect and feature of the present invention, there is provided an electric lawn mower comprising a cutter which is rotatably accommodated in a cutter housing including front and rear wheels. An electric motor is mounted on the cutter housing and provides a rotational power to the cutter. A pair of batteries are mounted on the cutter housing and supplies electric power to the electric motor. The electric motor is mounted at a substantially central portion of the cutter housing and is connected directly to the cutter. The batteries are mounted on the cutter housing in an arrangement such that the electric motor is sandwiched between front ends of the batteries. The distance between the rear ends of the batteries is smaller than the distance between the front ends of the batteries. Electric equipment is fixedly disposed on the cutter housing outside the rear ends of the batteries, respectively.

With the arrangement having the second feature, the lateral weight balance, due to the mounting of the batteries, is substantially uniform since at least the front ends of the batteries are located on opposite sides of the electric motor. The longitudinal length of a space needed above the cutter housing, in rear of the electric motor for mounting the batteries, can be relatively shortened, whereby the longitudinal length of the cutter housing can be shortened. In addition, since the electric motor is connected directly to the cutter, a space for disposing a power transmitting means between the electric motor and the cutter is not needed above the cutter housing. Hence, the cutter housing can be made compact. Moreover, since the batteries are disposed so that they are more spaced apart from each other in a forward direction, a relatively wide space can be ensured above the cutter housing outside the rear ends of the batteries. Since electric equipment is fixedly disposed outside the rear ends of the batteries, the equipment can be disposed effectively utilizing the space without increasing the width of the cutter housing.

According to a third aspect and feature of the present invention, in addition to the first or second feature, a control unit for controlling the operation of the electric motor is mounted on the cutter housing in front of the electric motor. One of the batteries, which is connected in series, is disposed on either the left or right of the electric motor with its minus terminal located at the front and its plus terminal located at the rear. The other battery is disposed on the other side of the electric motor with its plus terminal located at the front and its minus terminal located at the rear.

With the arrangement having the third feature, the connection between the batteries, which are connected in series, and the control unit can be achieved by sequentially connecting the control unit with the minus terminal of one of the batteries, the plus terminal of the one battery with the minus terminal of the other battery, and the plus terminal of the other battery with the control unit. Thus, the connecting wiring between the control unit and the batteries can be simplified.

The above and other objects, features and advantages of the invention will become apparent from the following description of the preferred embodiments taken in conjunction with the accompanying drawings.

BRIEF DESCRIPTION OF THE DRAWINGS

FIGS. 1 to 13 illustrate an embodiment of the present invention, wherein

DETAILED DESCRIPTION OF THE PREFERRED EMBODIMENT

Figure 1:
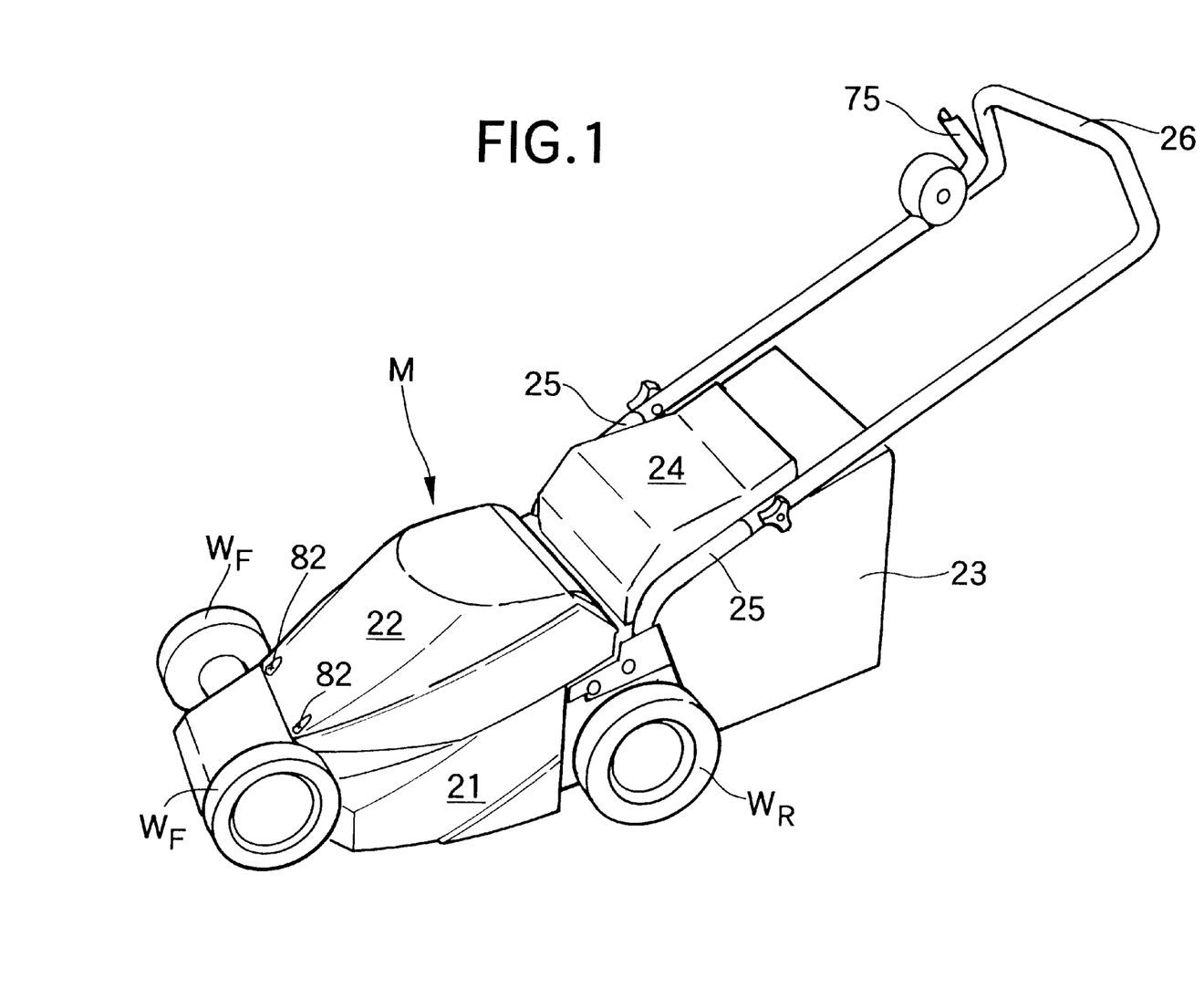
FIG. 1 is a side view of the entire electric lawn mower.
Figure 2:
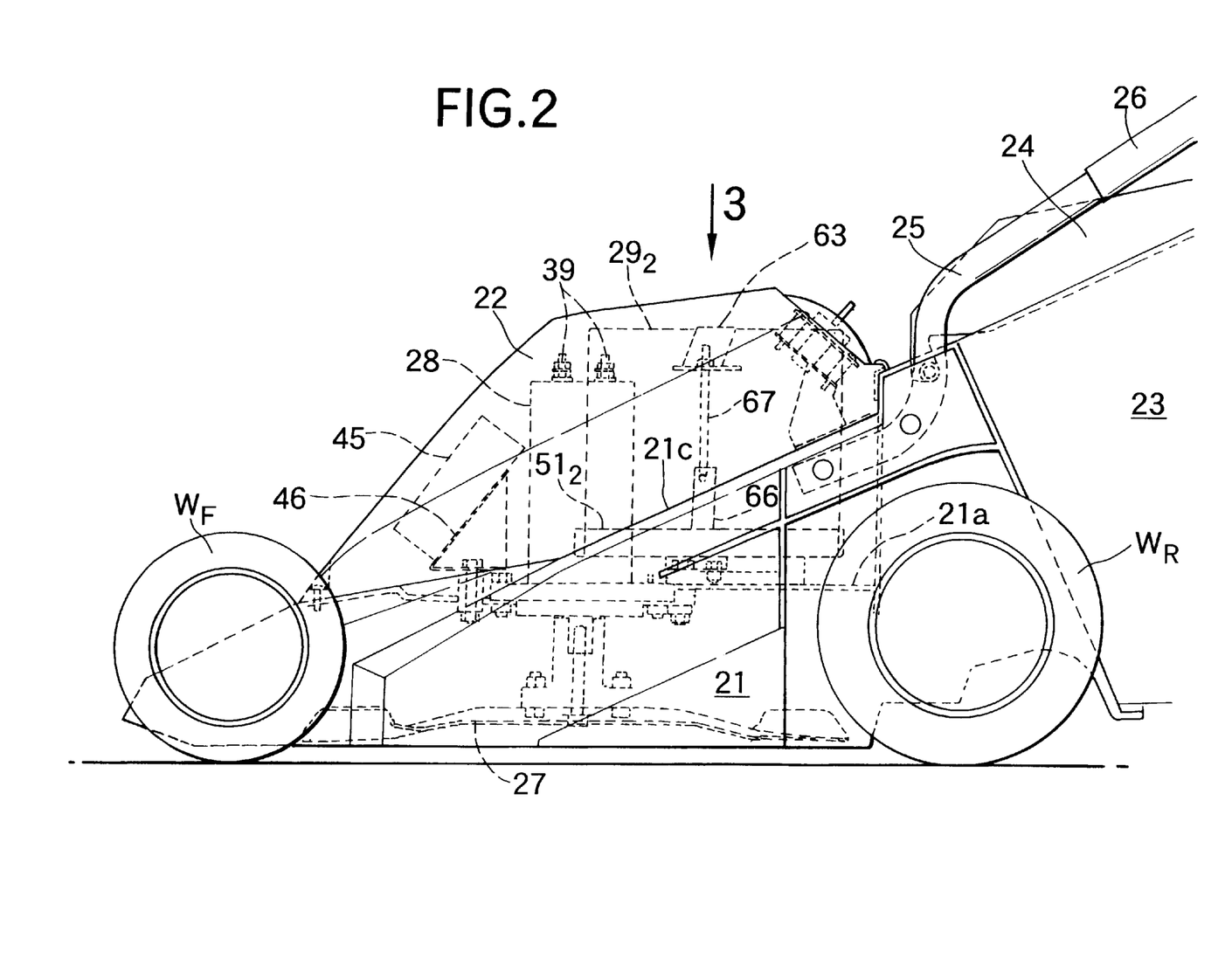
FIG. 2 is an enlarged side view of an essential portion of the electric lawn mower shown in FIG. 1.
Figure 3:
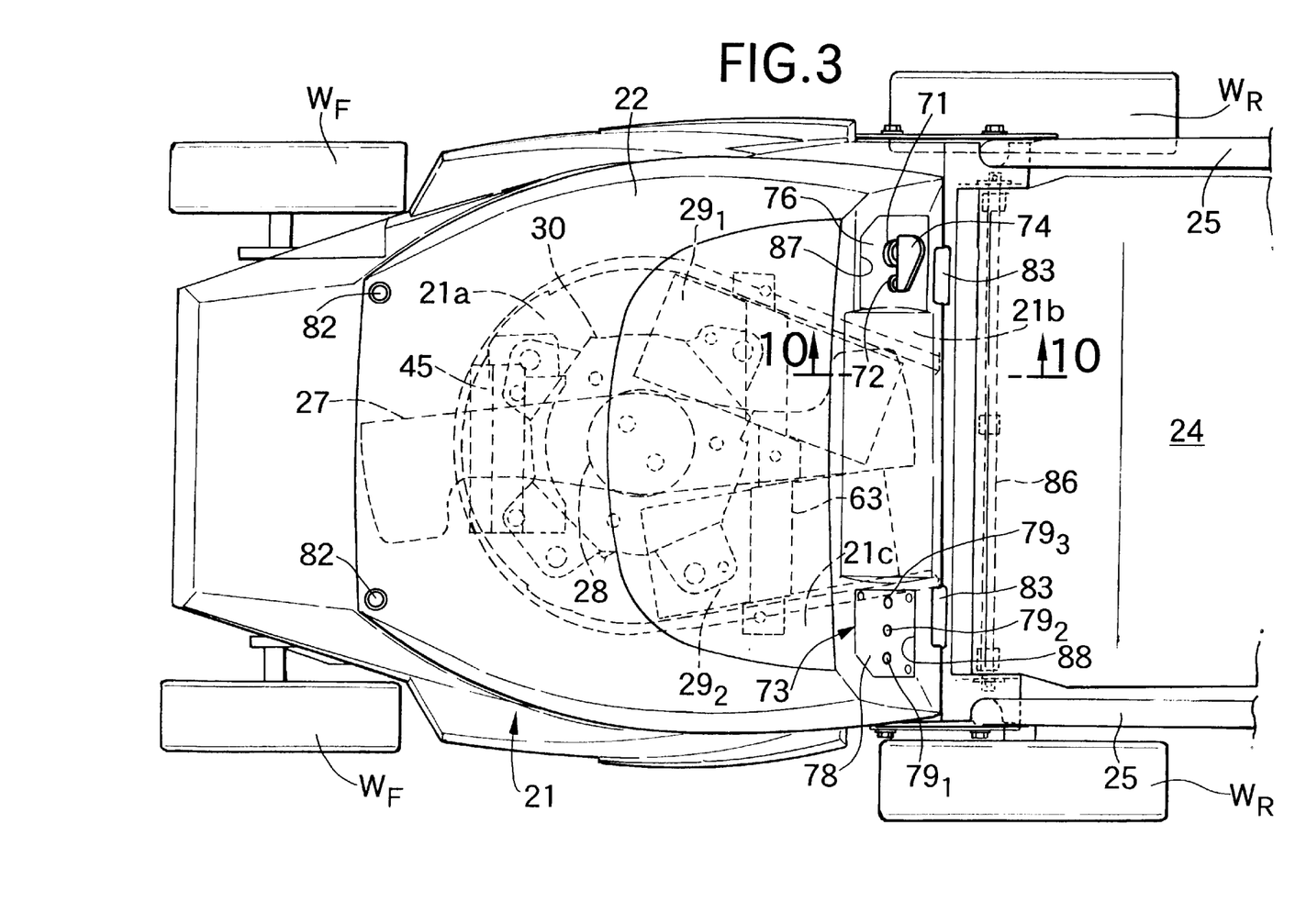
FIG. 3 is a plan view taken in a direction of an arrow 3 in FIG. 2.

The present invention will now be described by way of an embodiment with reference to FIGS. 1 to 13. Referring first to FIGS. 1 to 3, an electric lawn mower M includes a cutter housing 21 also serving as a vehicle frame. A pair of left and right front wheels $W_F$ are mounted at a front portion of the cutter housing 21. A pair of left and right rear wheels $W_R$ are mounted at a rear portion of the cutter housing 21. Moreover, the front wheels $W_F$ and the rear wheels $W_R$ are swingable about horizontal axes, so that a clearance between a ground surface and the cutter housing 21 can be regulated by locking the swung positions of the front wheels $W_F$ and the rear wheels $W_R$ by a locking means (not shown).

An upper portion of the cutter housing 21 is covered with a bowl-like housing cover 22. A grass bag 23, for accommodating lawn clippings, is detachably mounted at a rear end of the cutter housing 21. A discharge port cover 24 is vertically swingably connected to an upper portion of a rear end of the cutter housing 21. In a state in which the grass bag 23 has been mounted at the rear end of the cutter housing 21, the discharge port cover 24 is turnable upwards in a manner that it is retained on the grass bag 23.

Handlebar stays 25 are secured to left and right opposite sides of the rear end of the cutter housing 21. A handlebar 26 for pushing the electric lawn mower M is connected to the handlebar stays 25.

A cutter 27 is rotatably accommodated within the cutter housing 21. An electric motor 28 for providing a rotational power to the cutter 27 and a pair of batteries $29_1$ and $29_2$ for supplying an electric power to the electric motor 28 are mounted on the cutter housing 21.

Figure 4:
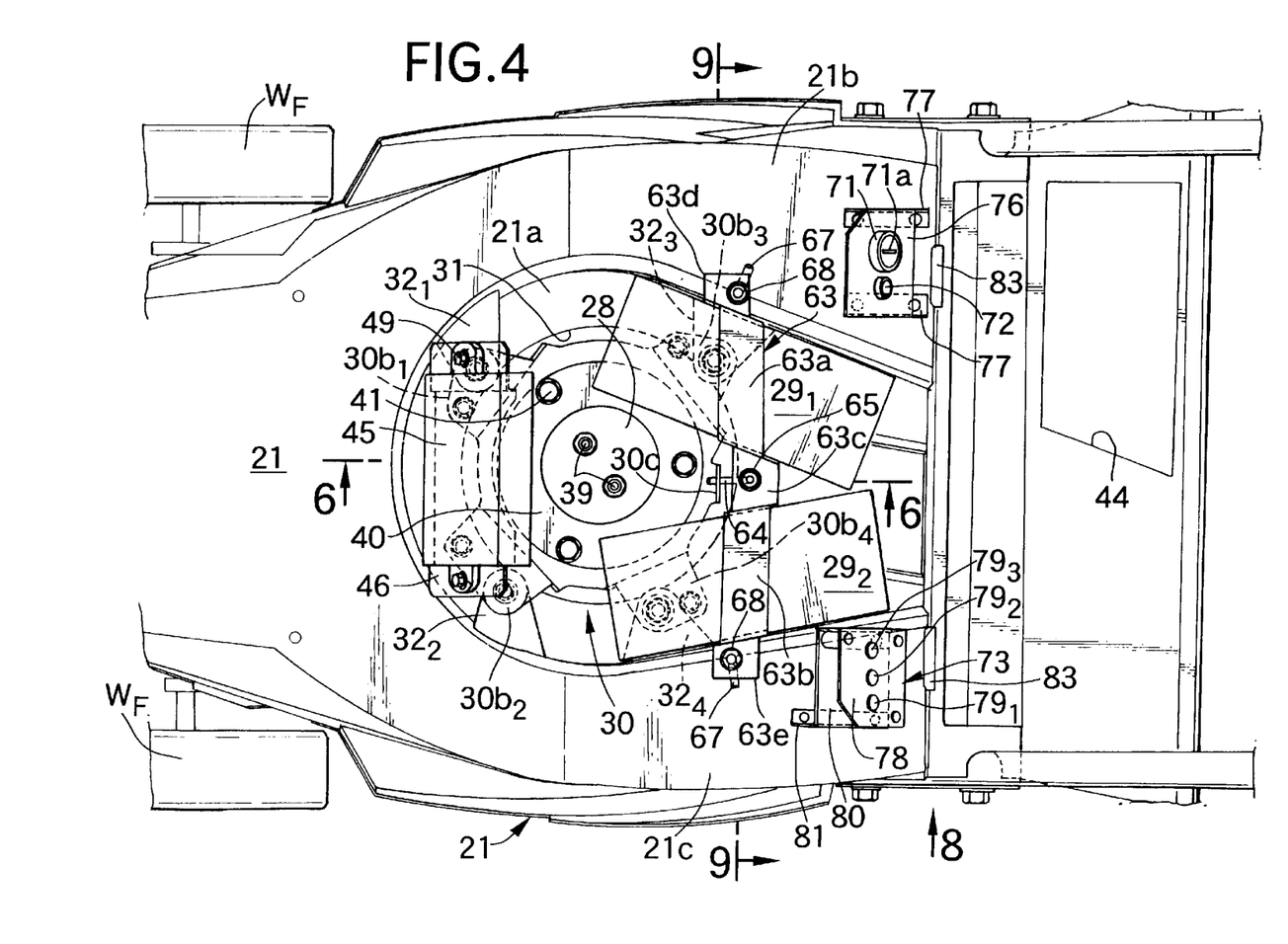
FIG. 4 is a plan view similar to FIG. 3, but in a state where a housing cover and a discharge port cover have been removed.
Figure 5:
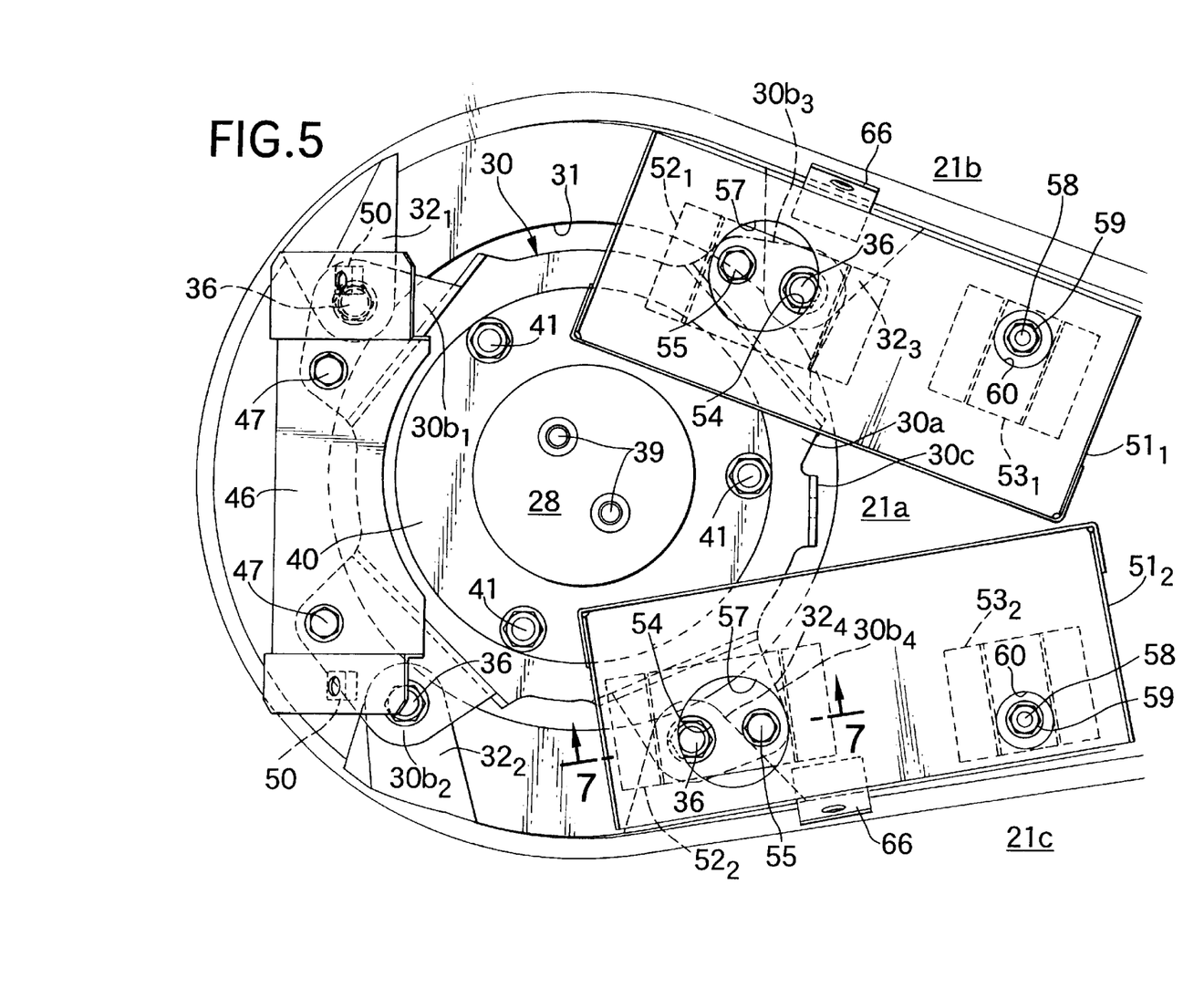
FIG. 5 is an enlarged view of an essential portion shown in FIG. 4 in a state in which batteries and a control unit have been removed.
Figure 6:
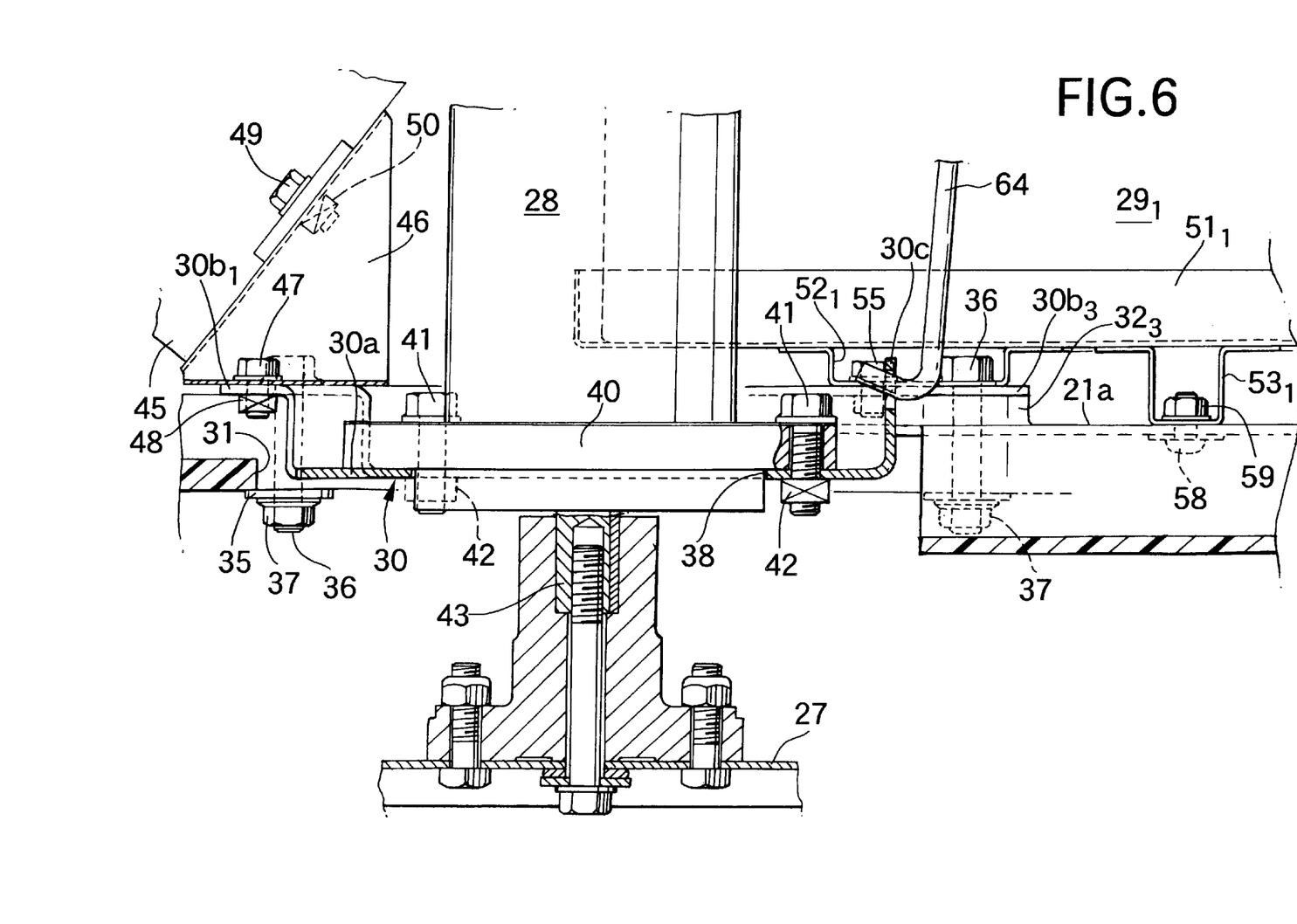
FIG. 6 is an enlarged sectional view taken along a line 6—6 in FIG. 4.

Referring also to FIGS. 4, 5 and 6, the cutter housing 21 is provided at its substantially central portion with a support plate portion 21a which is partially recessed downwards but formed substantially flat. The electric motor 28 is fixedly supported on the support plate portion 21a through a motor supporting bracket 30.

A circular mounting bore 31 is provided in the support plate portion 21a. The cutter housing 21 is provided with bulged support portions $32_1$ and $32_2$ which are bulged from the support plate portion 21a at right and left locations in front of the mounting bore 31. Bulged support portions $32_3$ and $32_4$ are bulged from the support plate portion 21a at right and left locations in a rear of the mounting bore 31.

The motor supporting bracket 30 is comprised of a flat plate-like base portion 30a inserted into the mounting bore 31. Mounting plate portions $30b_1$, $30b_2$, $30b_3$ and $30b_4$ are connected to the base portion 30a at locations corresponding to the bulged support portions $32_1$, $32_2$, $32_3$ and $32_4$. Each of the mounting plate portions $30b_1$, $30b_2$, $30b_3$ and $30b_4$ is formed into a substantially L-shape in vertical section on a corresponding one of the bulged support portions $32_1$, $32_2$, $32_3$ and $32_4$ to project outwards from the mounting bore 31.

Figure 7:
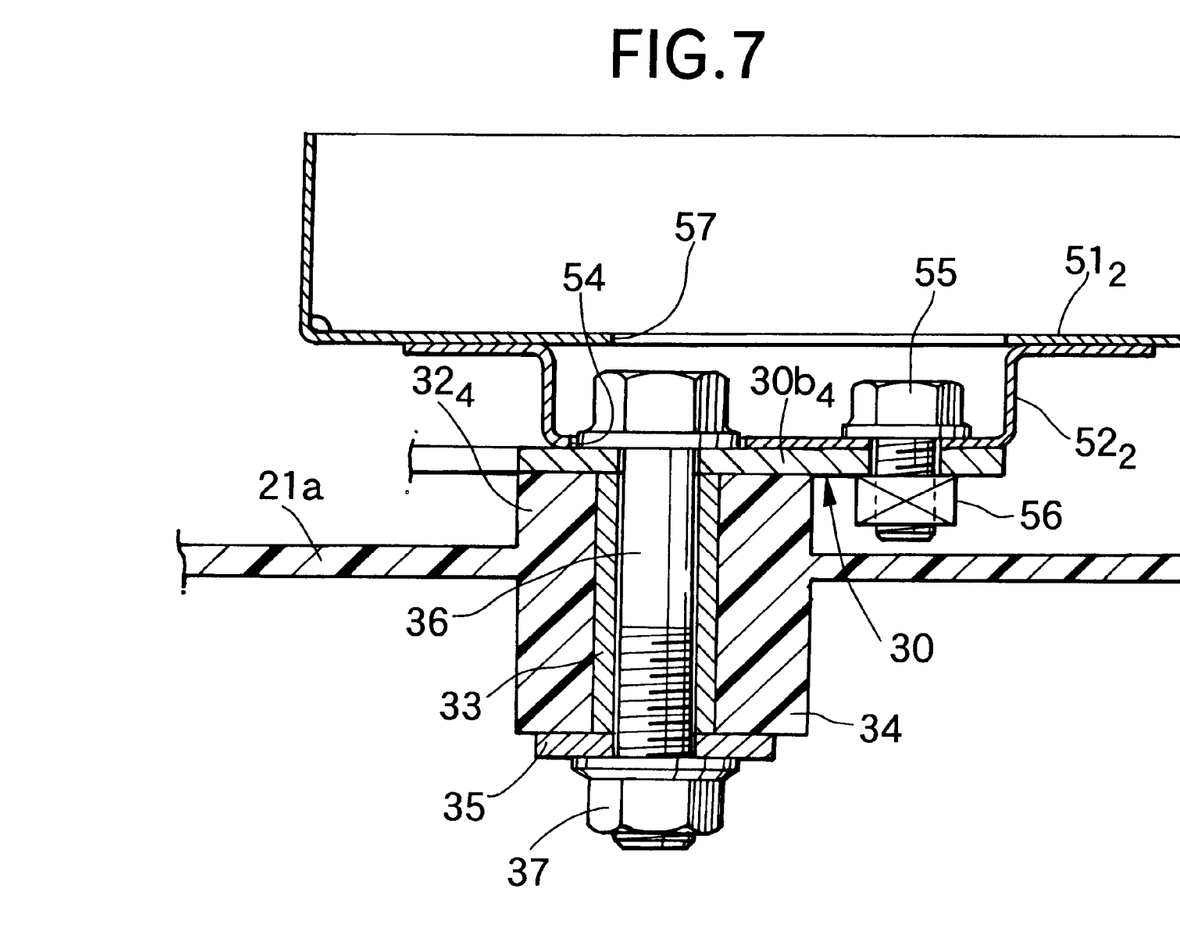
FIG. 7 is an enlarged sectional view taken along a line 7—7 in FIG. 6.

Referring also to FIG. 7, the bulged support portions $32_1$, $32_2$, $32_3$ and $32_4$, which are integral with the support plate portion 21a, are integrally provided with cylindrical boss portions 34, respectively, which extend downwards and into which collars 33 made of a metal are inserted, respectively. Washers 35 abut against lower end of the collars 33, respectively. Nuts 37 are threadedly fitted over lower ends of bolts 36 which are inserted through the mounting plate portions $30b_1$, $30b_2$, $30b_3$ and $30b_4$, the collars 33 and the washers 35 in a manner that locking heads at top ends are engaged with the mounting plate portions $30b_1$, $30b_2$, $30b_3$ and $30b_4$, respectively. The motor supporting bracket 30 is fixed to the supporting plate portion 21a by tightening the nuts 37.

A circular insertion bore 38 is provided in a central portion of the base 30a of the motor supporting bracket 30. A lower end of the electric motor 28, formed cylindrically and having a pair of connecting terminals 39 at its upper end, is inserted from above into the insertion bore 38. Moreover, the electric motor 28 is provided at its lower portion with a flange 40 which is placed on the base 30a at a peripheral edge of the insertion bore 38. The electric motor 28 is fixed onto the motor supporting bracket 30 by bringing bolts 41 into threaded engagement with nuts 42 welded to the base 30a. Bolts 41 are passed through the flange 40 and the base 30a at a plurality of, for example, three points spaced apart from one another circumferentially of the flange 40.

An output shaft 43 coaxially protrudes from the lower end of the electric motor 28. The cutter 27 having, for example, a single blade, is mounted to the output shaft 43.

On the right in a direction of forward movement of the electric lawn mower M, as clearly shown in FIG. 4, a discharge port 44 is defined in the rear end of the cutter housing 21, so that the grass pieces cut by the cutter 27 are discharged through the discharge port 44.

A scroll portion 21b, which is bulged from an outer edge of the support plate portion 21a on the right of the electric motor 28 and slanted up backwards, is provided on the cutter housing 21 in a manner to guide the cut grass pieces to the discharge port 44. The scroll portion 21b is formed into such a shape that the scroll portion 21b widens as it approaches the discharge port 44. On the other hand, a bulged slant portion 21c, which is bulged from the outer edge of the support plate portion 21a on the left of the electric motor 28 and sloped up rearwards, is provided on the cutter housing 21 in such a shape that it widens as it approaches the discharge port 44. The support plate portion 21a, which is sandwiched between the scroll portion 21b and the bulged slant portion 21c, is formed such that its width becomes smaller as it approaches the discharge port.

A bracket 46 for a unit is fastened to those mounting plate portions $30b_1$ and $30b_2$ of the motor supporting bracket 30 which are disposed in front of the electric motor 28. A control unit 45, for controlling the operation of the electric motor 28, is fastened onto the unit bracket 46. More specifically, bolts 47 are inserted through the mounting plate portions $30b_1$ and $30b_2$ and the unit bracket 46 at locations offset from the bulged support portions $32_1$ and $32_2$. The unit bracket 46 is fastened to the mounting plate portions $30b_1$ and $30b_2$ by threadedly fitting the bolts 47 into the nuts 48 which are welded to the lower surfaces of the mounting plate portions $30b_1$ and $30b_2$. The control unit 45 is fastened to opposite sides of the unit bracket 46 by a pair of bolts 49 and nuts 50 which are welded to lower surfaces of opposite sides of the unit bracket 46 for threaded engagement of the bolts 49.

Figure 8:
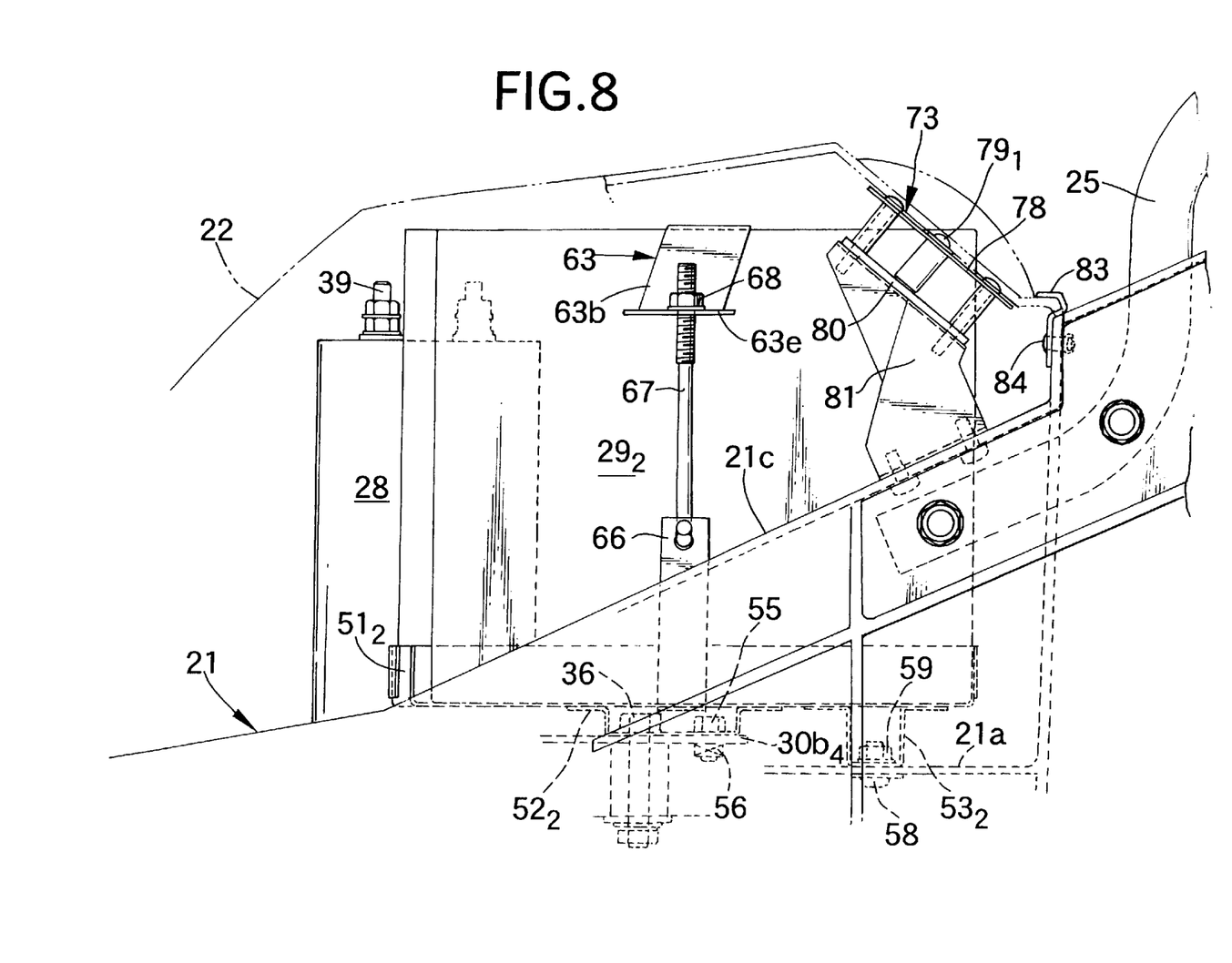
FIG. 8 is an enlarged view taken in a direction of an arrow 8 in FIG. 4.
Figure 9:
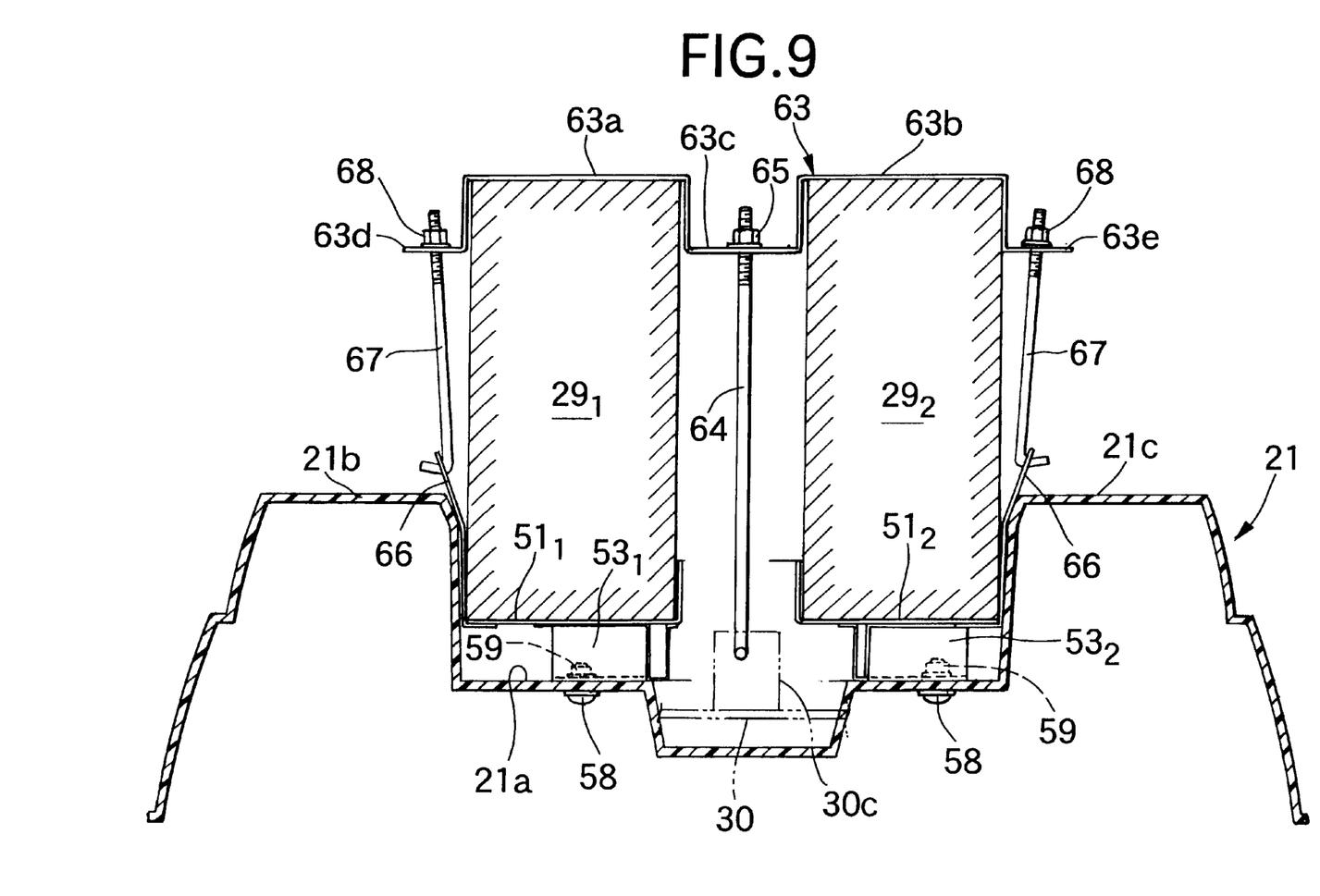
FIG. 9 is a sectional view taken along a line 9—9 in FIG. 4.

Referring also to FIGS. 8 and 9, the pair of batteries $29_1$ and $29_2$ are mounted on the support plate portion 21a in an arrangement such that the electric motor 28 is sandwiched between front ends of the batteries $29_1$ and $29_2$. One battery $29_1$ of the batteries $29_1$ and $29_2$ extends along the inner side of the scroll portion 21b, while the other battery $29_2$ extends along the inner side of the bulged slant portion 21c, i.e., in an arrangement such that the distance between the rear ends of the batteries $29_1$ and $29_2$ is smaller than the distance between the front ends of the batteries $29_1$ and $29_2$.

The batteries $29_1$ and $29_2$ are fixed onto battery trays $51_1$ and $51_2$. First legs $52_1$ and $52_2$ and second legs $53_1$ and $53_2$ are welded to bottoms of the battery trays $51_1$ and $51_2$. The first legs $52_1$ and $52_2$ are fastened to the mounting plate portions $30b_3$ and $30b_4$ provided on the motor supporting bracket 30 in the rear of the electric motor 28. The second legs $53_1$ and $53_2$ are fastened directly onto the support plate portion 21a in the rear of the first legs $52_1$ and $52_2$.

The first legs $52_1$ and $52_2$ are placed on the mounting plate portions $30b_3$ and $30b_4$. Each leg $52_1$ and $52_2$ has a circular bore 54 which is faced by the locking head of the bolt 36 for fastening the mounting plate portions $30b_3$ and $30b_4$ to the bulged support portions $32_3$ and $32_4$. Moreover, as shown in FIG. 7, bolts 55 are inserted through the first legs $52_1$ and $52_2$ and the mounting plate portions $30b_3$ and $30b_4$ at locations offset from the bulged support portions $32_3$ and $32_4$. The first legs $52_1$ and $52_2$ are fastened to the mounting plate portions $30b_3$ and $30b_4$ by threadedly inserting the bolts 55 into the nuts 56 which are welded to the lower surfaces of the mounting plate portions $30b_3$ and $30b_4$. The batteries trays $51_1$ and $51_2$ are provided at their bottoms with circular operating bores 57 enabling the operation of the bolts 36 and 55.

Bolts 58, passed through the support plate portion 21a from below the support plate portion 21a, are inserted through the second legs $53_1$ and $53_2$ placed on the support plate portion 21a as shown in FIG. 6. The second legs $53_1$ and $53_2$ are fastened onto the support plate portion 21a by bringing nuts 59, with the bolts 58 threadedly inserted thereinto, into engagement with the second legs $53_1$ and $53_2$. Moreover, the battery trays $51_1$ and $51_2$ are provided at their bottoms with circular operating bores 60 enabling the operation of the nuts 59.

A retaining plate 63 is placed onto the batteries $29_1$ and $29_2$ which are mounted on the battery trays $51_1$ and $51_2$. The retaining plate 63 is formed from a metal sheet and includes a first fitting portion 63a which is formed into a substantially U shape such that it opens downwards and into which the upper portion of one of the batteries $29_1$ is fitted, a second fitting portion 63b which is formed into a substantially U shape such that it opens downwards and into which the upper portion of the other battery $29_2$ is fitted, a connecting plate portion 63c which interconnects the fitting portions 63a and 63b, a first collar portion 63d protruding outwards from the first fitting portion 63a, and a second collar portion 63e protruding outwards from the second fitting portion 63b.

An upward-extending locking plate portion 30c is integrally connected to the base 30a of the motor supporting bracket 30 at a location substantially corresponding to the connecting plate portion 63c of the retaining plate 63. A nut 65 is threadedly fitted over an upper end of a bolt 64, which is passed through the connecting plate portion 63c, with its lower end engaged with the locking plate portion 30c. Locking plates 66 rise from sides of the battery trays $51_1$ and $51_2$ to above the scroll portion 21b and the bulged slant portion 21c and are secured to the battery trays $51_1$ and $51_2$ at locations substantially corresponding to the first and second collar portions 63d and 63e of the retaining plate 63. Nuts 68 are threadedly fitted over upper ends of bolts 67, which are passed through the collar portions 63d and 63e, with their lower ends engaged with the locking plates 66. Thus, the batteries $29_1$ and $29_2$ are fixed onto the battery trays $51_1$ and $51_2$ by tightening the nuts 65 and 68.

Figure 10:
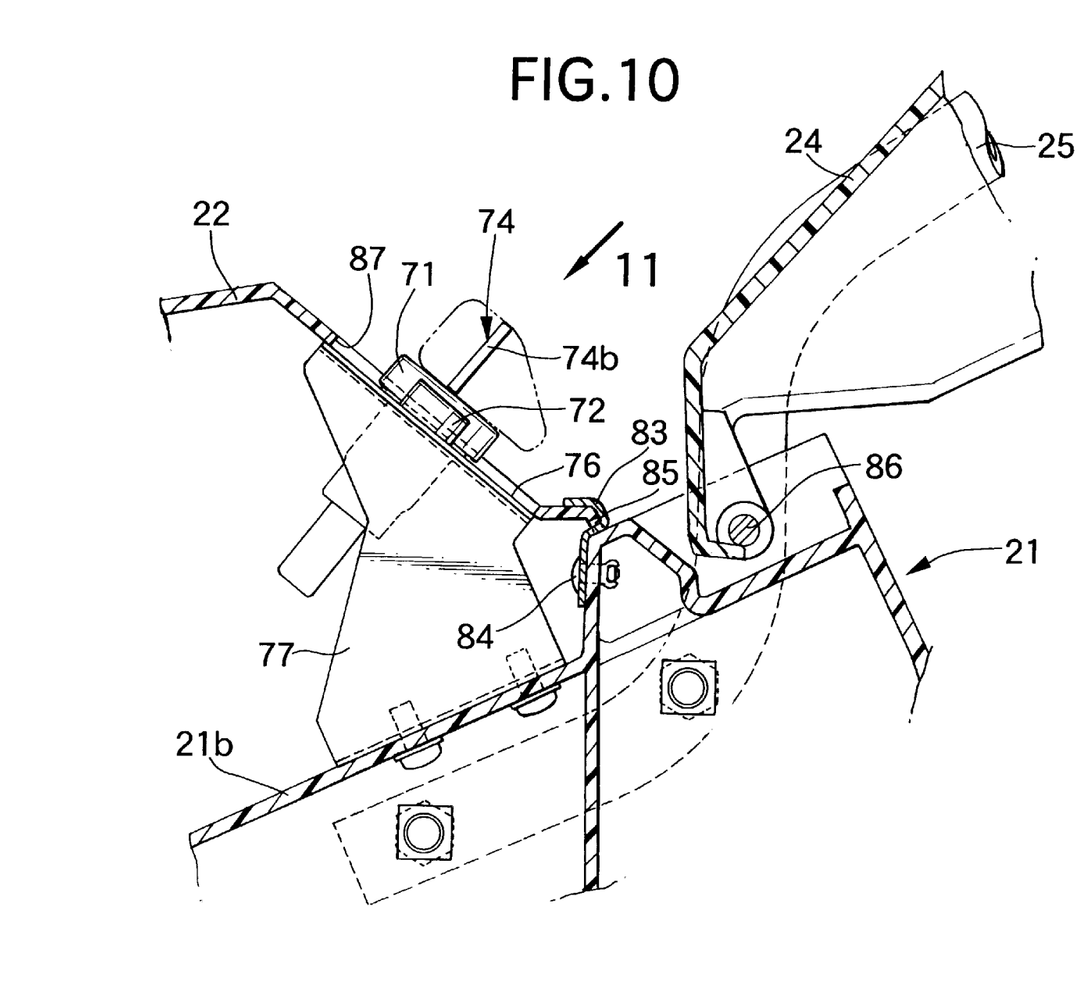
FIG. 10 is an enlarged sectional view taken along a line 10—10 in FIG. 3.
Figure 11:
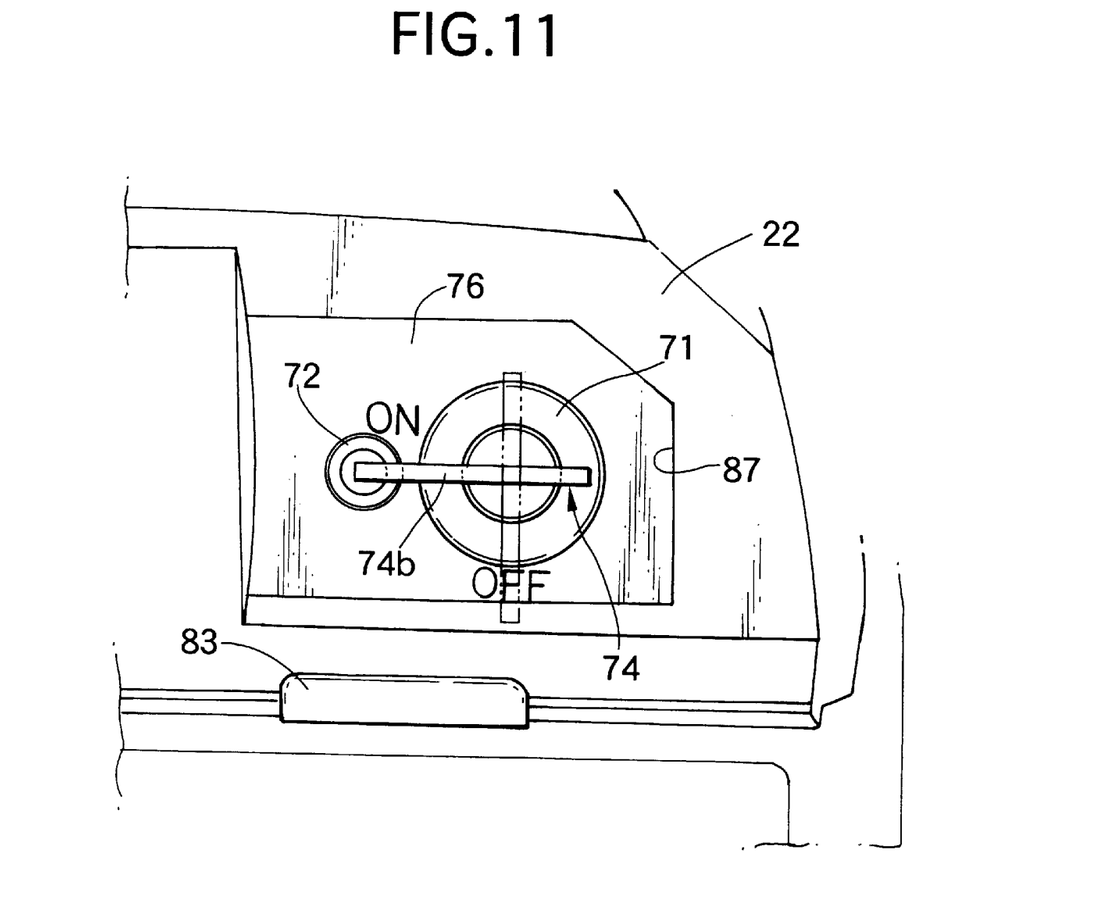
FIG. 11 is a view taken in a direction of an arrow 11 in FIG. 10.

Referring also to FIGS. 10 and 11, a relatively wide space is produced outside the rear end of each of the batteries $29_1$ and $29_2$ above the cutter housing 21 by the fact that the batteries $29_1$ and $29_2$ are disposed on the cutter housing 21, so that they are gradually spaced apart from each other in a forward direction. To effectively utilize the space, a switch 71 and a connector 72, as electric equipment, are fixedly disposed on the scroll portion 21b outside the rear end of the one battery $29_1$. An indicator 73, as shown in FIGS. 3 and 4 as electric equipment, is fixedly disposed on the bulged slant portion 21c outside the rear end of the other battery $29_2$.

The switch 71 is capable of being switched over between a first state, in which electric power can be supplied from the batteries $29_1$ and $29_2$ to the electric motor 28, and a second state, in which electric power cannot be supplied from the batteries $29_1$ and $29_2$ to the electric motor 28. When the switch 71 is in the first state, electric power is supplied to the electric motor 28 to drive the cutter 27 by operating an operating switch 75 (see FIG. 1) mounted on a handlebar 26. Moreover, a key bore 71a is provided in one end of the switch 71, so that a key member 74 can be removably inserted into the key bore 71a, only when the switch 71 is in the second state. The switch 71 is switched over by turning the key member 74 while inserted into the key bore 71a, for example, through 90 degree. On the other hand, the connector 72 is of a female type, to which a male-type connector can be connected. The male-type connector is mounted at a tip end of a connecting cord for supplying a charging electric power from an external power source to the batteries $29_1$ and $29_2$.

Figure 12:
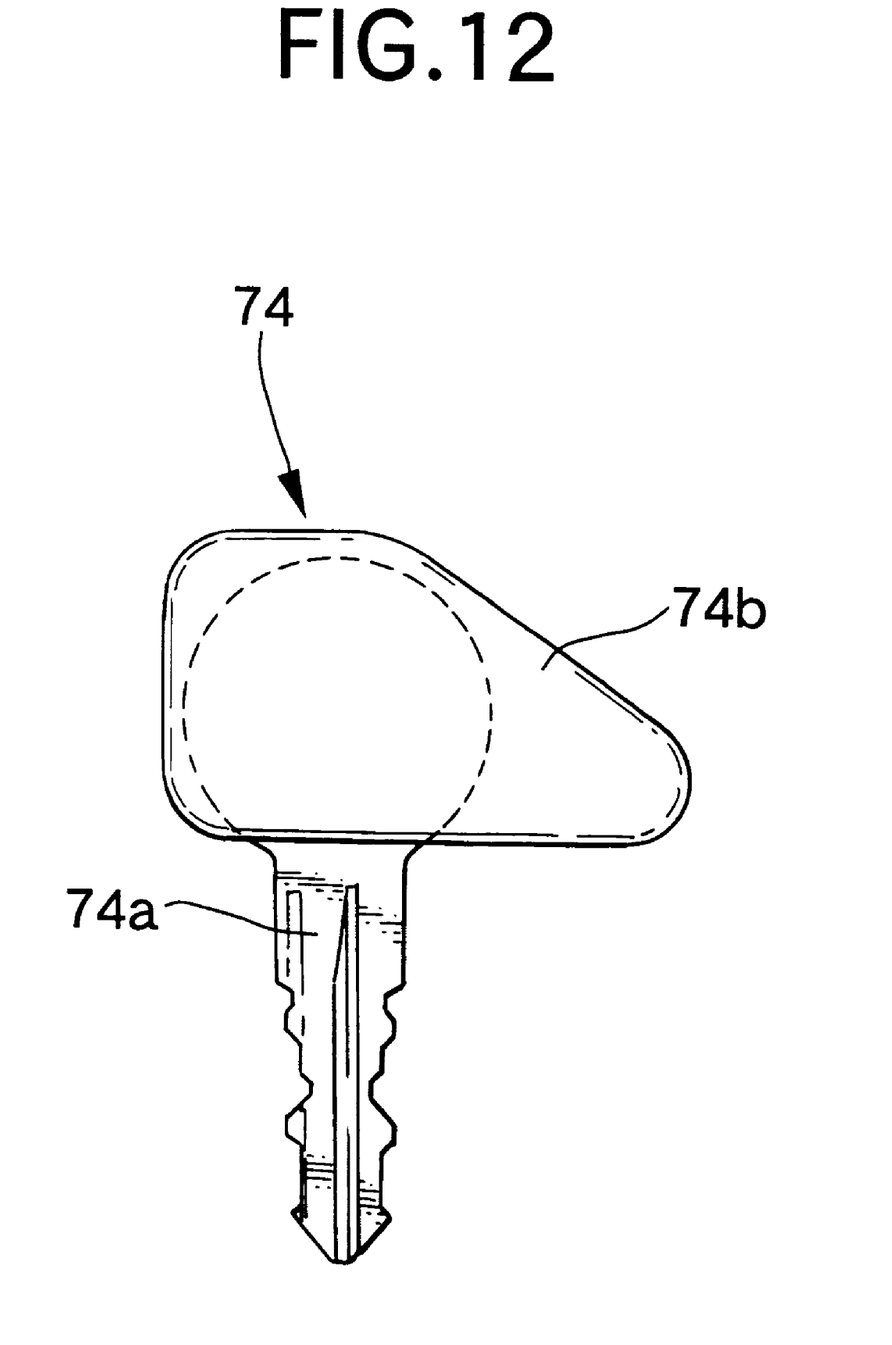
FIG. 12 is a side view of a key member.

Referring to FIG. 12, the key member 74 includes a key body 74a whose one end can be inserted into the key bore 71a, and an operating portion 74b integrally or detachably provided at the other end of the key body 74a. The operating portion 74b is formed into such a shape that it protrudes outwards from the key body 74a.

A pair of brackets 77, as shown in FIG. 4, are fastened to the upper surface of the scroll portion 21b. The switch 71 is fixed to a support plate 76 fixed onto the brackets 77, so that one end thereof protrudes from the support plate 76. As clearly shown in FIG. 11, an "ON" position and an "OFF" position are indicated on the support plate 76 at two points spaced apart at approximately 90 degree from each other around the switch 71. When the operating portion 74b of the key member 74 is in the "ON" position, the switch 71 assumes the first state in which electric power can be supplied from the batteries $29_1$ and $29_2$ to the electric motor 28. When the operating portion 74b is in the "OFF" state, the switch 71 assumes the second state in which electric power cannot be supplied from the batteries $29_1$ and $29_2$ to the electric motor 28.

The connector 72 is fixed to the support plate 76 at a portion corresponding to the "ON" position in proximity to the switch 71. When the key member 74 is turned so that the operating portion 74b thereof assumes the "ON" position in order to bring the switch 71 into the first state, the connector 72 is covered with the operating portion 74b, so that the external power source cannot be connected to the connector 72.

An indicator 73, as shown in FIG. 4, includes a first base plate 78, first, second and third indicating lamps $79_1$, $79_2$ and $79_3$ such as luminescent diodes mounted in a line on the first base plate 78, and a second base plate 80 disposed below the first base plate 78. The indicator 73 is fixed onto a bracket 81 which is fastened onto the bulged slant portion 21c. Drive circuits (not shown) for the indicating lamps $79_1$, $79_2$ and $79_3$ are carried on the second base plate 80, so that the indicating lamps $79_1$, $79_2$ and $79_3$ are turned on depending upon the remaining capacity of the batteries $29_1$ and $29_2$. Moreover, the first and second indicating lamps $79_1$ and $79_2$ are green, and the third indicating lamp $79_3$ is red. When the batteries $29_1$ and $29_2$ are in their fully charged states, the first and second green lamps $79_1$ and $79_2$ are turned on. When the batteries $29_1$ and $29_2$ reaches their semi-charged states, the first indicating lamp $79_1$ is turned off, while the second indicating lamp $79_2$ remains turned on. Further, when charging of the batteries $29_1$ and $29_2$ is required, the first and second green lamps $79_1$ and $79_2$ are turned off, while the third red indicating lamp $79_3$ is turned on.

The remaining capacity of the batteries $29_1$ and $29_2$ is clearly indicated by changing of the on-off modes of the indicating lamps $79_1$, $79_2$ and $79_3$ in the above manner. When charging of the batteries $29_1$ and $29_2$ is required, a user is thus informed. Thus, the life of the batteries $29_1$ and $29_2$ can be prolonged.

Figure 13:
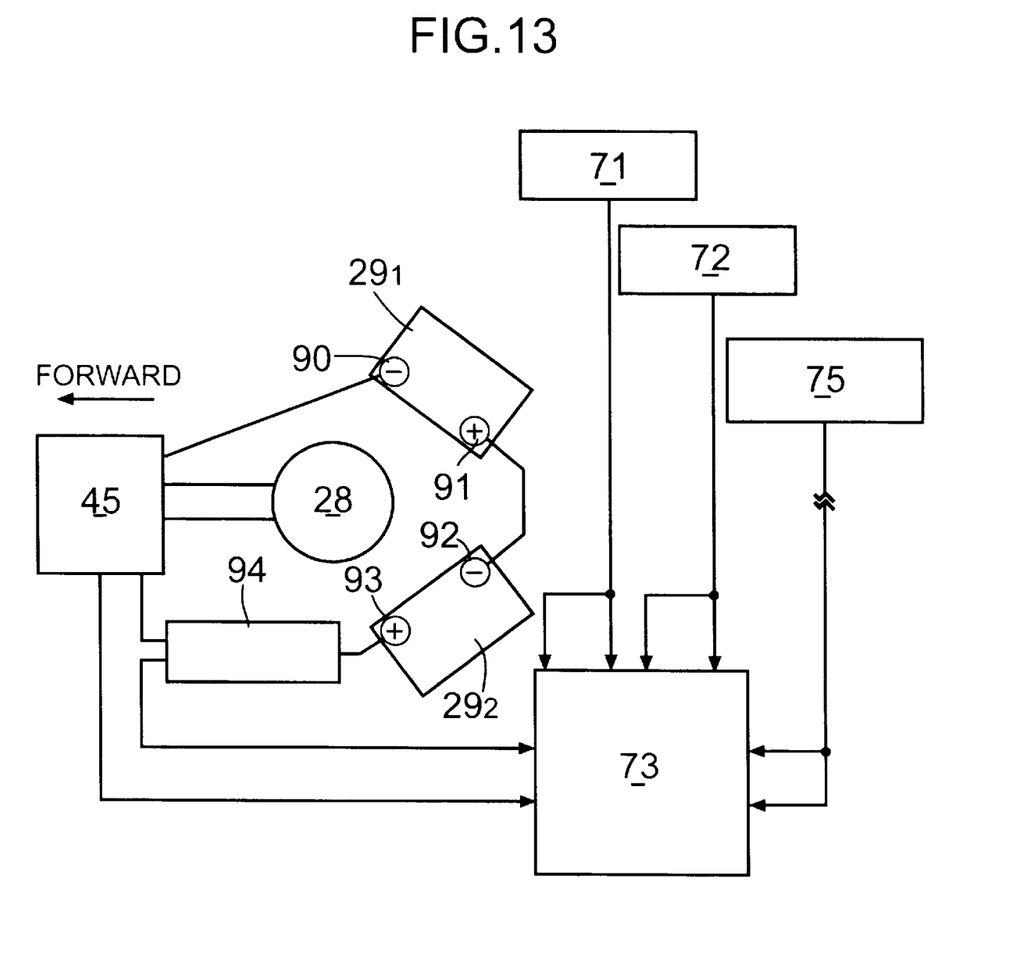
FIG. 13 is a diagram showing a state in which an electric motor, the control unit and the batteries have been electrically connected to one another.

The electric motor 28, the batteries $29_1$ and $29_2$, the control unit 45, the switch 71, the connector 72 and the indicator 73 are disposed on the cutter housing 21 in an arrangement as shown in FIG. 13. One battery $29_1$ of the batteries $29_1$ and $29_2$ is disposed on the right of the electric motor 28 with its minus terminal 90 located at the front and its plus terminal 91 located at the rear. The other battery $29_2$ is disposed on the left of the electric motor 28 with its minus terminal 92 located at the rear and its plus terminal 93 located at the front. Therefore, electric connection between the control unit 45, which is disposed in front of the electric motor 28 and connected to the electric motor 28 through a pair of cables, and the batteries $29_1$ and $29_2$, which are connected in series, is achieved by sequentially connecting the control unit 45 with the minus terminal 90 of the one battery $29_1$, the plus terminal 91 of the one battery $29_1$ with the minus terminal 92 of the other battery $29_2$, and the plus terminal 93 of the other battery $29_2$ with the control unit 45. Thus, the connecting wiring between the control unit 45 and the batteries $29_1$ and $29_2$ can be simplified. A fuse 94 is mounted between the plus terminal 93 of the other battery $29_2$ and the control unit 45.

The control unit 45 and the indicator 73 are connected to each other, for example, through a 6-core flat cable, and the switch 71, the connector 72 and the operating switch 75 are also connected to the indicator 73.

The housing cover 22 is mounted to the cutter housing 21, so that it covers the electric motor 28, the batteries $29_1$ and $29_2$ and the control unit 45 which are mounted on the cutter housing 21. The switch 71, the connector 72 and the first, second and third indicating lamps $79_1$, $79_2$ and $79_3$ are exposed to the outside. The housing cover 22 is fastened at its front portion to the cutter housing 21 by a pair of threaded members 82 (see FIG. 1). Engage members 83 are secured to the rear portion of the cutter housing 21 by clips 84 at two points spaced apart from each other in a widthwise direction of the cutter housing 21. The rear portion of the housing cover 22 is resiliently engaged with the engage members 83. Moreover, notches 85 are provided at the rear end of the housing cover 22, as shown in FIG. 10, and the engage members 83 are fitted into the notches 85. Thus, the looseness of the housing cover 22 in the widthwise direction of the cutter housing 21 is inhibited by the fitting of the engage members 83 into the notches 85.

An opening 87, for outside exposure of the switch 71 and the connector 72, is provided in the rear portion of the housing cover 22, so that it is closed by the support plate 76. An opening 88, for outside exposure of the first, second and third indicating lamps $79_1$, $79_2$ and $79_3$, is also provided in the rear portion of the housing cover 22, so that it is closed by the first base plate 78.

The discharge port cover 24 is turnably supported at its front end on the rear end of the cutter housing 21 through a support shaft 86. The cover 24 is swingable between an opened position (a position shown in FIG. 1) in which it has been swung upwards and retained above the grass bag 23, and a closed position in which, when the grass bag has been removed, the discharge port cover 24 covers the discharge port 44 in the cutter housing 21. The lower end of the discharge port cover 24 serves as a discharge bore.

The operation of this embodiment will be described below. Since the pair of batteries $29_1$ and $29_2$ are mounted on the cutter housing 21 in such a manner that the front ends thereof are disposed on opposite sides of the electric motor 28, the lateral weight balance of the cutter housing 21 is substantially uniform, thereby enhancing the travelability of the electric lawn mower M. Moreover, the longitudinal length of the space, which should be ensured above the cutter housing 21 in rear of the electric motor 28 for mounting the batteries $29_1$ and $29_2$, can be relatively shortened, whereby the longitudinal length of the cutter housing 21 can be relatively shortened. In addition, since the electric motor 28 is connected directly to the cutter 27, a space for disposing the power transmitting means between the electric motor 28 and the cutter 27 is not required above the cutter housing 21. Hence, the cutter housing 21 can be more compact since the longitudinal lengths can be shortened.

One battery $29_1$ of the batteries $29_1$ and $29_2$ is disposed along the inner side of the scroll portion 21b which is widened as it approaches the discharge port 44. Thus, the area of the discharge port 44 cannot be narrowed due to the mounting of the pair of batteries $29_1$ and $29_2$. In addition, since the batteries $29_1$ and $29_2$ are mounted on the support plate portion 21a lying at a relatively low level, they can be mounted at a relatively low location on the cutter housing 21 which lowers the center of gravity of the traveling section including the cutter housing 21 and which suppresses the height of the traveling section to a relatively low level.

Additionally, since the batteries $29_1$ and $29_2$ are disposed with the distance between their front ends being larger than the distance between their rear ends, a relatively wide space can be ensured above the cutter housing 21 outside the rear ends of the batteries $29_1$ and $29_2$. As a result, the switch 71, the connector 72 and the indicator 73 can be fixedly mounted outside the rear ends of the batteries $29_1$ and $29_2$, and disposed effectively utilizing the space without increasing the width of the cutter housing 21.

Moreover, one battery $29_1$ of the batteries $29_1$ and $29_2$ is disposed on either the left or right side of the electric motor 28 with its minus terminal 90 located at the front and its plus terminal 91 located at the rear. The other battery $29_2$ is disposed on the other of the left or right side of the electric motor 28 with its minus terminal 92 located at the rear and its plus terminal 93 located at the front. Therefore, the electric connection between the batteries $29_1$ and $29_2$, which are connected in series, and the control unit 45 is achieved by sequentially connecting the batteries $29_1$ and $29_2$ and the control unit 45 in one direction around the electric motor 28. Thus, the connecting wiring between the control unit 45 and the batteries $29_1$ and $29_2$ can be simplified.

The key member 74, for switching the switch 71, is comprised of the key body 74a whose one end can be inserted into and removed from the key bore 71a in the switch 71, and the operating portion 74b integrally or removably provided at the other end of the key body 74a to protrude sideways from the key body 74a. When the key member 74 has been operated to the "ON" position, the connector 72 is covered by the operating portion 74b of the key member 74, so that it cannot be connected to an external power source. Therefore, the switch 71 can be switched between the state in which electric power can be supplied to the electric motor 28 and the batteries $29_1$ and $29_2$ cannot be charged, and the state in which electric power cannot be supplied to the electric motor 28 and the batteries $29_1$ and $29_2$ can be charged by the simple operation of only turning the key member 74 which is not withdrawn from the switch 71 with a simple structure without other parts than the switch 71, the key member 74, and the connector 72.

Although the present invention has been described as being applied to the electric lawn mower M in the embodiment, the present invention is applicable to an electric lawn mower adapted to cut grass other than a lawn. In addition, although the bulged slant portion 21c which is bulged to become higher at its rear portion, as is the scroll portion 21b, has been provided on the left of the cutter housing 21 in the embodiment, a portion corresponding to the bulged slant portion 21c may be formed substantially flat. Further, although the electric lawn mower has been described in the embodiment as designed to be pushed, the present invention is applicable to an electric lawn mower designed to automatically move due to power from the electric motor 28. In this case, a transmitting device such as a transmission can be effectively accommodated in the bulged slant portion 21c which is bulged to become higher at its rear portion, as is the scroll portion 21b.

Although the present invention has been described in detail, it will be understood that the present invention is not limited to the above-described embodiment, and various modifications in design may be made without departing from the spirit and scope of the invention which is defined in the claims.

What is claimed is:

1. An electric lawn mower comprising:

a cutter housing including front and rear wheels;

a cutter rotatably accommodated in the cutting housing;

an electric motor mounted on the cutter housing for providing a rotational power to the cutter;

a pair of batteries mounted on the cutter housing for supplying electric power to said electric motor; and a control unit mounted on said cutter housing in front of said electric motor for controlling an operation of said electric motor, wherein said cutter housing has a discharge port defined in a rear end thereof for discharging lawn pieces cut by said cutter, a support plate portion for mounting the electric motor which is disposed at a substantially central portion of said cutter housing and which is connected directly to said cutter, and a scroll portion which is bulged from an outer edge of the support plate portion on one side of said electric motor to guide the lawn pieces to said discharge port and which is formed into a shape that slopes up rearwards and widens approaching said discharge port; and wherein said batteries are mounted on said support plate portion in an arrangement such that one of said batteries extends along an inner side of said scroll portion and said electric motor is sandwiched between front ends of said batteries, and that a distance between the front ends of the batteries is larger than a distance between rear ends of the batteries.

2. An electric lawn mower according to claim 1, wherein one of said batteries, which are connected in series, is disposed on one side of said electric motor with a minus terminal located at the front and a plus terminal located at the rear, while the other battery is disposed on the other side of said electric motor with a plus terminal located at the front and a minus terminal located at the rear.

3. An electric lawn mower comprising:

a cutter housing including front and rear wheels, and a support plate portion;

a housing cover for covering an upper portion of the housing;

a cutter rotatably accommodated in said cutter housing;

an electric motor mounted on said cutter housing for providing a rotational power to said cutter; and a pair of batteries mounted on said cutter housing for supplying electric power to said electric motor;

wherein said electric motor is mounted at a substantially central portion of said support plate portion and connected directly to said cutter;

said batteries are mounted on said support plate portion in an arrangement such that said electric motor is sandwiched between front ends of said batteries and a distance between rear ends of said batteries is smaller than a distance between the front ends of said batteries;

said cutter housing has a pair of slant portions that are provided on lateral outer sides of said batteries, respectively, and slope up rearwards; and said electric lawn mower further includes electric equipment fixedly disposed on said slant portions outside the rear ends of the batteries, respectively, wherein said motor and said batteries are covered with said housing cover from outside while said electric equipment is exposed to the outside.

4. An electric lawn mower according to claim 3, further including a control unit mounted on said cutter housing in front of said electric motor for controlling an operation of said electric motor, and wherein one of said batteries, which are connected in series, is disposed on one side of said electric motor with a minus terminal located at the front and a plus terminal located at the rear, while the other battery is disposed on the other side of said electric motor with a plus terminal located at the front and a minus terminal located at the rear.

\* \* \* \* \*